United States Patent
Perez et al.

(10) Patent No.: US 9,852,175 B2
(45) Date of Patent: *Dec. 26, 2017

(54) MANAGING A DATA SET

(71) Applicant: International Business Machines Corporation, Armonk, NY (US)

(72) Inventors: Miguel A. Perez, Miami, FL (US); David C. Reed, Tucson, AZ (US); Max D. Smith, Tucson, AZ (US); Carrie B. Wood, Albuquerque, NM (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/429,711

(22) Filed: Feb. 10, 2017

(65) Prior Publication Data
US 2017/0147632 A1    May 25, 2017

Related U.S. Application Data (63) Continuation of application No. 13/972,317, filed on Aug. 21, 2013, now Pat. No. 9,607,036.

(51) Int. Cl.
*G06F 7/00* (2006.01)
*G06F 17/30* (2006.01)
*H04L 29/08* (2006.01)

(52) U.S. Cl.
CPC .. *G06F 17/30377* (2013.01); *G06F 17/30569* (2013.01); *G06F 17/30988* (2013.01); *H04L 67/1097* (2013.01)

(58) Field of Classification Search
CPC ......... G06F 17/30377; G06F 17/30569; G06F 17/30988; H04L 67/1097
See application file for complete search history.

(56) References Cited

U.S. PATENT DOCUMENTS

| | | | |
|---|---|---|---|
| 5,185,886 A | 2/1993 | Edem et al. | |
| 5,220,665 A * | 6/1993 | Coyle, Jr. | ........... G06F 17/3041 707/E17.007 |
| 5,349,684 A | 9/1994 | Edem et al. | |
| 5,369,763 A | 11/1994 | Biles | |

(Continued)

OTHER PUBLICATIONS

Perez et al., "Managing a Data Set", U.S. Appl. No. 15/677,152, filed Aug. 15, 2017.

(Continued)

*Primary Examiner* — Daniel Kuddus
(74) *Attorney, Agent, or Firm* — Jay Wahlquist (57) ABSTRACT

A method of and system for managing a data set of a storage facility is disclosed. The data set may be a sequential-access data set. The method and system may include structuring the sequential-access data set to have a first group-of-records configured for adding a second group-of-records to the sequential-access data set. The method and system add a second group-of-records to the sequential-access data set. The method and system merge the second group-of-records with the first group-of-records in response to a triggering event. The method and system establish, in response to merging the second group-of-records with the first group-of-records, a marker configured to indicate the first and second group-of-records, as merged, is sorted.

1 Claim, 4 Drawing Sheets

(56) References Cited

U.S. PATENT DOCUMENTS

| | | | |
|---|---|---|---|
| 5,497,486 A | 3/1996 | Stolfo et al. | |
| 5,615,366 A * | 3/1997 | Hansen | G06F 7/24 |
| 5,619,265 A * | 4/1997 | Suzuki | H04N 1/2112 |
| | | | 348/362 |
| 5,758,191 A * | 5/1998 | Kasebayashi | G06F 3/061 |
| | | | 710/29 |
| 5,842,207 A | 11/1998 | Fujiwara et al. | |
| 5,860,924 A | 1/1999 | Quistgaard | |
| 6,112,209 A * | 8/2000 | Gusack | G06F 17/30321 |
| 6,212,526 B1 | 4/2001 | Chaudhuri et al. | |
| 6,226,634 B1 | 5/2001 | Ogihara et al. | |
| 6,609,100 B2 | 8/2003 | Smith et al. | |
| 6,631,477 B1 | 10/2003 | LeCrone et al. | |
| 7,962,524 B2 * | 6/2011 | Okamoto | G06F 7/24 |
| | | | 707/790 |
| 8,214,599 B2 * | 7/2012 | de la Iglesia | G06F 12/0862 |
| | | | 711/100 |
| 8,375,014 B1 | 2/2013 | Brocato et al. | |
| 8,934,642 B2 | 1/2015 | Stultz et al. | |
| 8,943,059 B2 | 1/2015 | Rozenwald et al. | |
| 9,268,832 B1 * | 2/2016 | Challapalli | G06F 17/30575 |
| 9,442,972 B2 | 9/2016 | Perez et al. | |
| 2004/0225666 A1 | 11/2004 | Hinshaw et al. | |
| 2005/0166161 A1 | 7/2005 | Makela | |
| 2006/0031267 A1 * | 2/2006 | Lim | G06F 11/1471 |
| 2007/0005598 A1 * | 1/2007 | Okamoto | G06F 7/24 |
| 2008/0010101 A1 | 1/2008 | Williamson et al. | |
| 2009/0077078 A1 | 3/2009 | Uppala et al. | |
| 2009/0171866 A1 | 7/2009 | Harun et al. | |
| 2009/0319499 A1 | 12/2009 | Meijer et al. | |
| 2010/0106724 A1 * | 4/2010 | Anderson | G06F 17/30979 |
| | | | 707/737 |
| 2011/0313999 A1 * | 12/2011 | Bruno | G06F 17/30463 |
| | | | 707/718 |
| 2012/0131022 A1 | 5/2012 | Uppala et al. | |
| 2012/0271845 A1 | 10/2012 | Netz et al. | |
| 2012/0303930 A1 | 11/2012 | Coker et al. | |
| 2013/0061023 A1 | 3/2013 | Wu et al. | |
| 2014/0122294 A1 | 5/2014 | Chen et al. | |
| 2014/0149357 A1 | 5/2014 | Gupta | |
| 2015/0058365 A1 | 2/2015 | Perez et al. | |
| 2015/0066834 A1 | 3/2015 | Jeffries | |

OTHER PUBLICATIONS

List of Patents or Patent Applications Treated as Related, Aug. 7, 2017. 2 pages.
Artis, H., "Data Set Allocation and Performance Management Under System Managed Storage", Proceedings of CMG '90. 12 pages. Performance Associates, Inc., 1990.
List of IBM Patents or Patent Applications Treated as Related, Feb. 9, 2017. 2 pages.
U.S. Appl. No. 14/974,518, Accelerated Examination Search Document, Dec. 17, 2016. 6 pages.

* cited by examiner

MANAGING A DATA SET

TECHNICAL FIELD

This disclosure relates generally to computer systems and, more particularly, relates to managing a data set of a storage system.

BACKGROUND

The amount of data that needs to be managed by enterprises is growing at an extremely high rate. Management of storage environments may need to be performed with as few errors as possible. As data needing to be managed increases, the need for management efficiency may increase.

SUMMARY

Aspects of the disclosure relate to sorting or merging data in storage. The methodology provides a marker (pointer) at the end of a sort. As data is added to storage, a threshold initiates the methodology to perform a sort which begins at the marker. In accordance with the methodology, the newly sorted data is merged with the earlier data and the marker is updated. The methodology may improve performance when sorting or merging data in storage.

Aspects of the disclosure may include a method of and system for managing a data set of a storage facility. The data set may be a sequential-access data set. The method and system may include structuring the sequential-access data set to have a first group-of-records configured for adding a second group-of-records to the sequential-access data set. The method and system add a second group-of-records to the sequential-access data set. The method and system merge the second group-of-records with the first group-of-records in response to a triggering event. The method and system establish, in response to merging the second group-of-records with the first group-of-records, a marker configured to indicate the first and second group-of-records, as merged, is sorted.

Aspects of the disclosure include the triggering event. The triggering event may be, as examples, a threshold value or an operation related to the sequential-access data set. In embodiments, the triggering event occurs in response to the second group-of-records reaching the threshold value. In embodiments, the triggering event occurs in response to an operation associated with the sequential-access data set happening. Aspects of the disclosure provide a methodology for sorting or merging records of data sets in a storage system that may provide benefits associated with increased efficiency.

DETAILED DESCRIPTION

Aspects of the disclosure relate to sorting or merging data in storage. The methodology provides a marker (pointer) at the end of a sort. As data is added to storage, a threshold initiates the methodology to perform a sort which begins at the marker. In accordance with the methodology, the newly sorted data is merged with the earlier data and the marker is updated. The methodology may improve performance when sorting or merging data in storage.

An entire data set of a storage system can be sorted in response to a specific instruction from a client to do so. Absent a specific instruction from a client, an indication of when to sort a data set may not be readily apparent. For sequential-access data sets, new records are inserted at the end of the data set. When these data sets are re-sorted, the entire data set is sorted even though the first part of the data may have already been sorted previously. A tracking mechanism to track the sorted and unsorted portions of the data set may provide benefits (e.g., efficiency) so that the entire data set is not re-sorted each time a sort program is run against it. In addition, data sets are often sorted when very few items have changed within the data set. Tracking the amount of changes since the last sort and running that sort in response to a data set close can optimize the sort cycle.

An operating system having a product such as System Managed Storage (SMS) can allow users to assign a Management Class to data sets. The Management Class enables SMS to manage user data with options preferred by the user. In embodiments, aspects of the disclosure create a new feature in the Management Class so that SMS will implement a feature to a data set at the time of a close operation. In this way, the system can sort the data efficiently and the programmer for the application will not need to invest storage or time in hard coding (or explicitly calling) a sort program. The feature marks the position at the end of the data set the last time it was sorted. Since records are added to the end of sequential files during updates, the newly added records may be designated by the feature as the unsorted section of the data set. By keeping track of the unsorted portion of the data set, aspects of the disclosure can reduce the overall time to perform the sort operation by sorting the newly added records and merging them into the base data set when a threshold has been met.

Aspects of the disclosure include a method and system for managing a data set of a storage facility (i.e., storage system). The method and system may work on a number of operating systems. The data sets can be sequential-access data sets (e.g., records are retrieved in sequence). The method and system may include structuring the sequential-access data set to have a first group-of-records configured for adding a second group-of-records to the sequential-access data set. A second group-of-records is added to the sequential-access data set. The second group-of-records may be separate from the first group-of-records. In response to a triggering event, the second group-of-records is sorted or merged with the first group-of-records. In response to merging the second group-of-records with the first group-of-records, a marker is established. The marker may indicate the first and second group-of-records, as merged, is sorted. Put differently, the marker may identify a sorted group-of-records of the sequential-access data set by marking an end of the sequential-access data set. From another perspective, establishing the marker indicates an existing group-of-records of the sequential-access data set is sorted in response to the sorting of the existing group-of-records.

Aspects of the disclosure include the triggering event. The triggering event may be, as examples, a threshold value or an operation related to the sequential-access data set. In embodiments, the triggering event occurs in response to the second group-of-records reaching the threshold value. The threshold value may include an association with a quantity-of-changes to the sequential-access data set since a previous sort. The threshold value can be a user-defined value or a predetermined value. In embodiments, the triggering event occurs in response to an operation associated with the sequential-access data set happening; for instance, an operation configured to close the sequential-access data set being requested.

Aspects of the disclosure include sorting or merging. In embodiments, merging includes sorting. In particular, merging may include sorting in an order based on record-values of at least one record-field in a manner configured to arrange records in a particular sequence. In embodiments, merging includes combining the first and second group-of-records in a manner configured to produce one group-of-records in a particular sequence. Aspects of the disclosure can include designating the second group-of-records is unsorted in response to adding the second group-of-records to the sequential-access data set. Aspects of the disclosure provide a methodology for sorting or merging records of data sets in a storage system that may provide benefits associated with increased efficiency.

Figure 1:
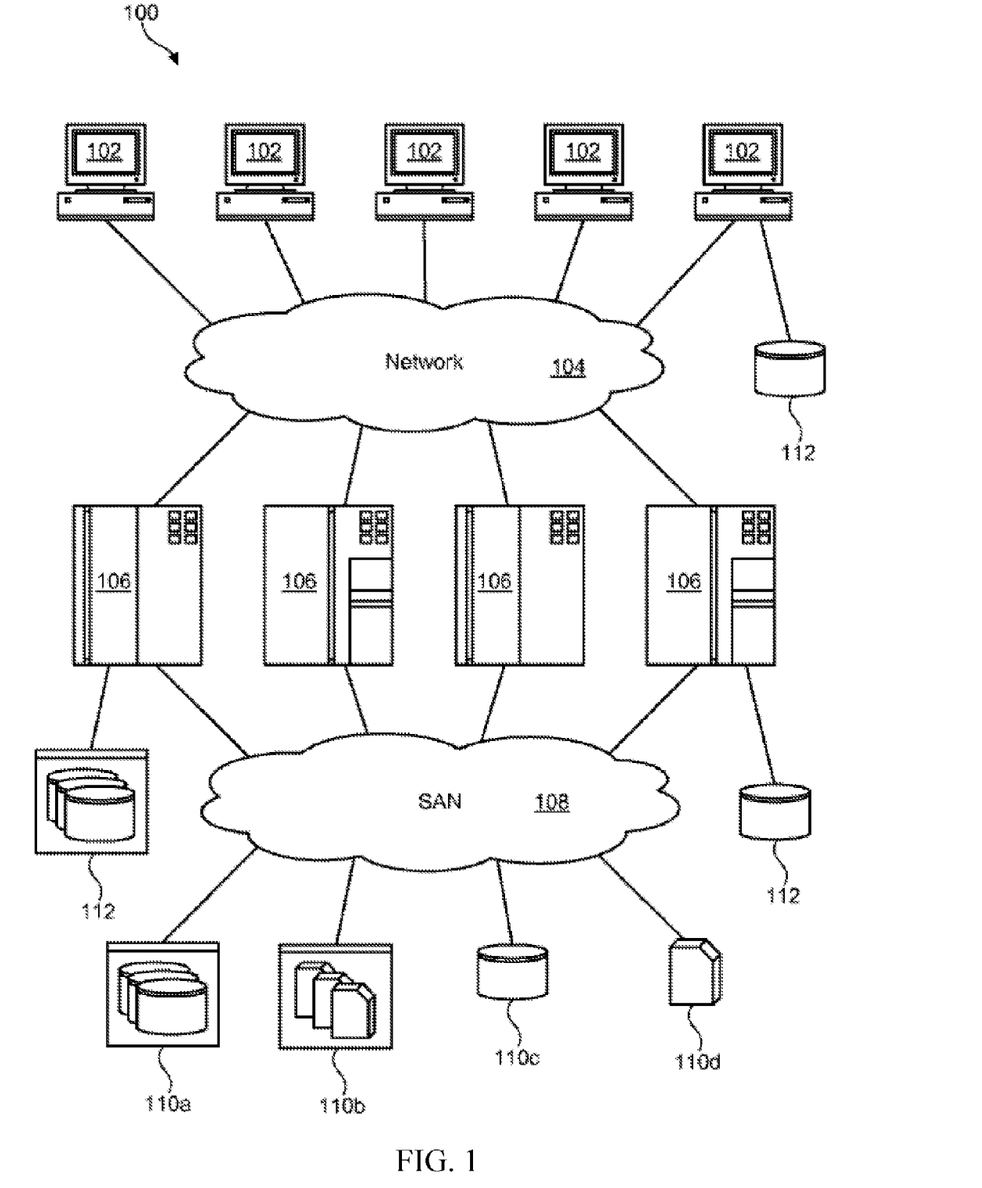
FIG. 1 illustrates an example network architecture according to embodiments.

FIG. 1 illustrates an example network architecture 100 according to embodiments. The network architecture 100 is presented to show one example of an environment where a system and method in accordance with the disclosure may be implemented. The network architecture 100 is presented only by way of example and is not intended to be limiting. The system and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN), a wide-area-network (WAN), the Internet, an intranet, or the like. In certain embodiments, the computers 102, 106 may include both client computers 102 and server computers 106 (also referred to herein as "host systems" 106 or alternatively as "host devices"). In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may contain storage pools that may benefit from techniques of the disclosure.

The network architecture 100 may, in certain embodiments, include a storage network 108 behind the servers 106, such as a storage-area-network (SAN) or a LAN (e.g., when using network-attached storage). This network 108 may connect the servers 106 to one or more storage systems 110 (alternatively, remote systems or remote devices), such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may contain storage pools that may benefit from techniques according to the disclosure.

In embodiments, techniques of the disclosure may permit data in the storage pools of storage systems 110, 112 to be sorted or merged without unnecessarily sorting a portion that has already been sorted. Moreover, aspects of the disclosure can sort or merge data in response to a triggering event. Therefore, the methodology may provide benefits associated with increased efficiency in relation to the example network architecture 100 illustrated by FIG. 1.

Figure 2:
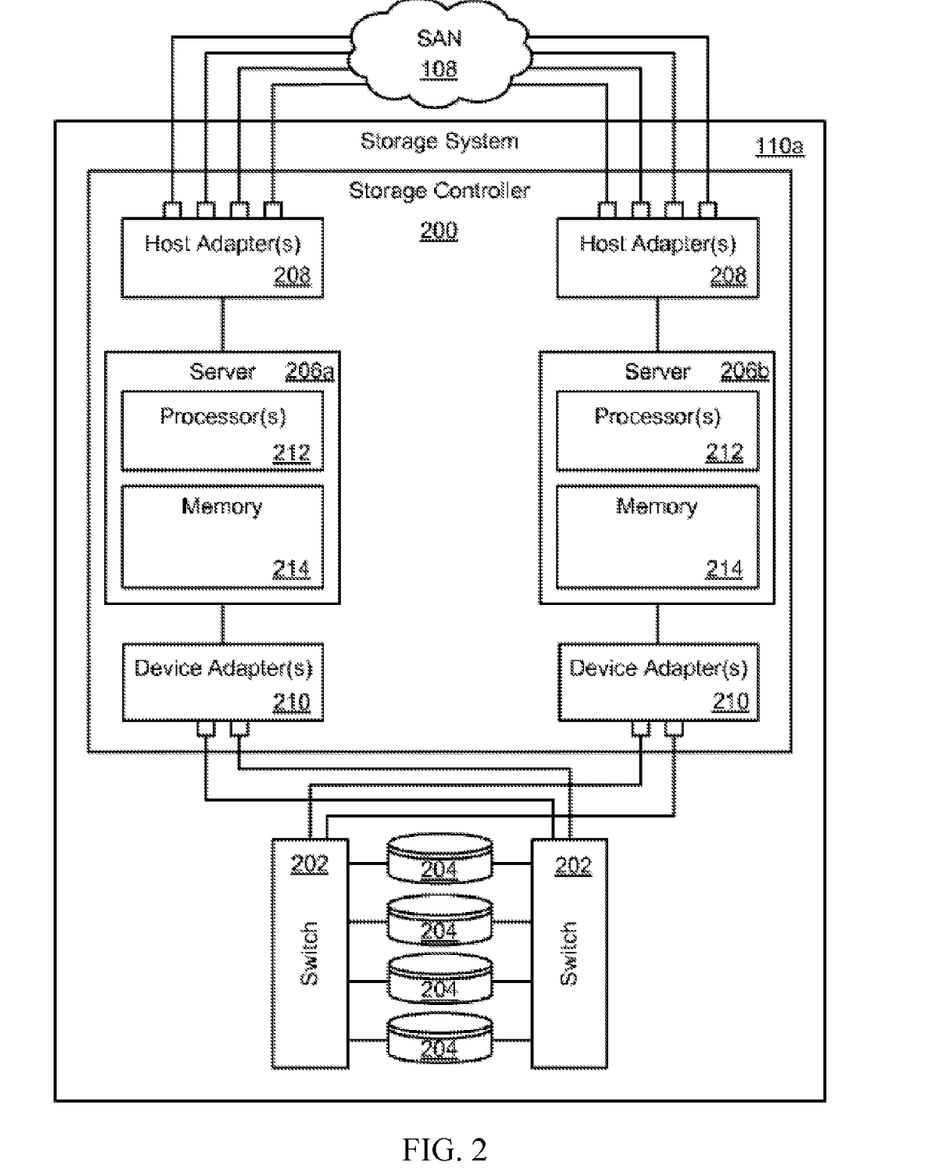
FIG. 2 illustrates an example storage system containing an array of storage devices according to embodiments.

FIG. 2 illustrates an example storage system 110a containing an array of storage devices 204 (e.g., hard-disk drives and/or solid-state drives) according to embodiments. The internal components of the storage system 110a are shown in accordance with the disclosure and may be used to manage such a storage system 110a. Nevertheless, techniques according to the disclosure may also be implemented within other storage systems 110, 112. As shown, the storage system 110a includes a storage controller 200, one or more switches 202, and one or more storage devices 204, such as hard-disk drives or solid-state drives (e.g., flash-memory-based drives). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

Particular enterprise storage systems may have a storage system 110a having an architecture similar to that illustrated in FIG. 2. Particular enterprise storage systems may include a high-performance, high-capacity storage controller providing disk storage that is designed to support continuous operations. Particular enterprise storage systems may use servers 206a, 206b, which may be integrated with a virtualization engine technology. Nevertheless, techniques according to the disclosure are not limited to any specific enterprise storage system 110a, but may be implemented in any comparable or analogous storage system 110 regardless of the manufacturer, product name, or components or component names associated with the storage system 110. Any storage system 110 that could benefit from techniques according to the disclosure is deemed to fall within the scope of the disclosure. Thus, the enterprise storage system shown is presented only by way of example and is not intended to be limiting.

In selected embodiments, each server 206 includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

In embodiments, techniques of the disclosure may permit data in the storage devices 204 to be sorted or merged without unnecessarily sorting a portion that has already been sorted. Moreover, aspects of the disclosure can sort or merge data in response to a triggering event. Therefore, the methodology may provide benefits associated with increased efficiency in relation to the example storage system 110*a* containing an array of storage devices 204 illustrated by FIG. 2.

Figure 3:
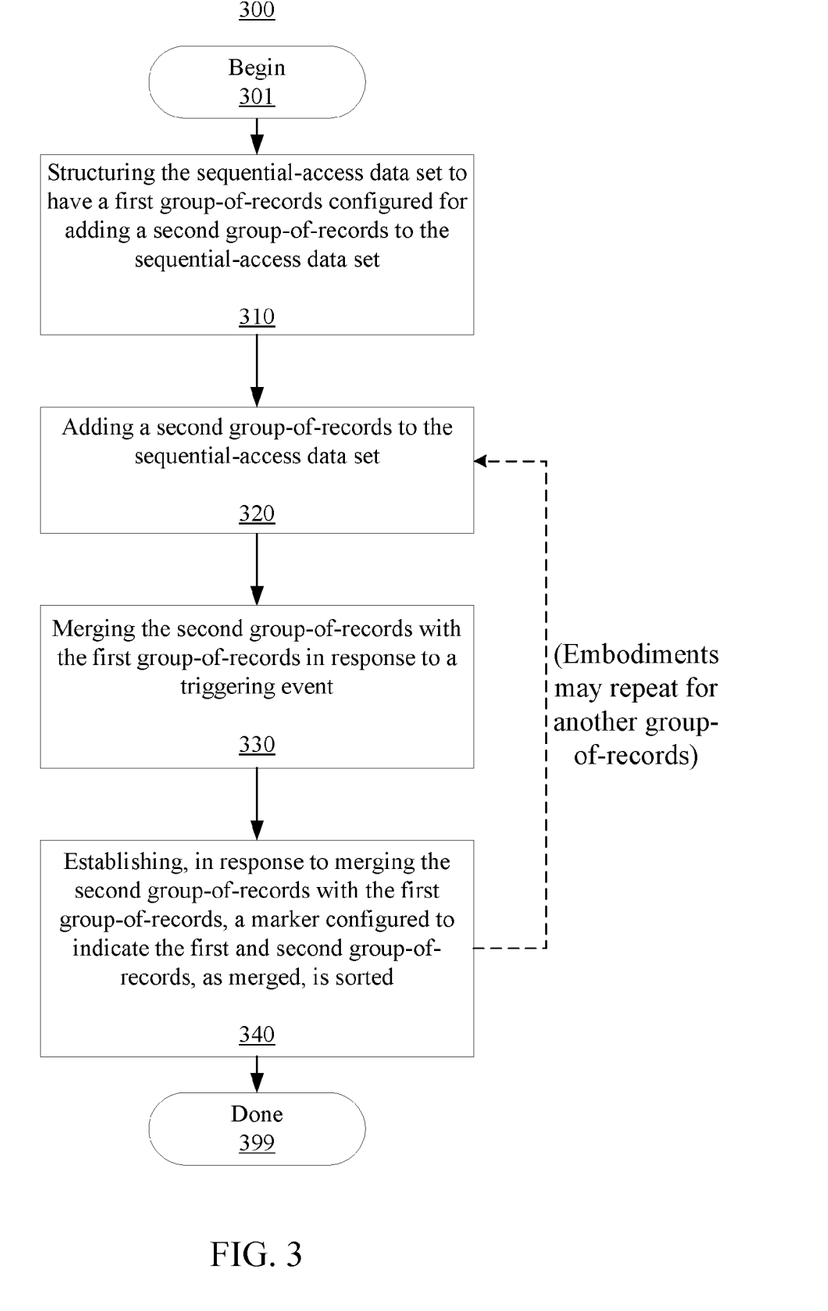
FIG. 3 is a flowchart illustrating a method for managing a data set of a storage system according to embodiments.

FIG. 3 is a flowchart illustrating a method 300 for managing a data set of a storage system according to embodiments. Method 300 may work on a number of operating systems. Method 300 begins at block 301. The data set can be a sequential-access data set (e.g., records are retrieved in sequence). In sequential-access, a series of records is retrieved in sequence. For example, a record may be retrieved by its entry sequence, key sequence, or relative-record sequence. In each example, a record is located by its position relative to the last record (e.g., the most recent record listed or accessed). Types of sequential-access data sets include Basic Sequential Access Method (BSAM), Queued Sequential Access Method (QSAM), and Virtual Storage Access Method (VSAM). At block 310, the sequential-access data set may be structured to have a first group-of-records configured for adding a second group-of-records to the sequential-access data set.

A second group-of-records is added to the sequential-access data set at block 320. The second group-of-records can be separate from the first group-of-records. In such case, the added second group-of-records may be non-interdigitated with, but may be adjacent to, the preexisting first group-of-records. In embodiments, the second group-of-records may be designated as unsorted. The designation as unsorted can occur in response to adding the second group-of-records to the sequential-access data set. The designation serves the purpose of identifying each of the two separate groups-of-records (sorted and unsorted).

In response to a triggering event, the second group-of-records is sorted or merged with the first group-of-records at block 330. The triggering event may be, as examples, a threshold value or an operation related to the sequential-access data set. In embodiments, the triggering event occurs in response to the second group-of-records reaching the threshold value. The threshold value may include an association with a quantity-of-changes to the sequential-access data set since a previous sort. The threshold value can be a user-defined value (e.g., time since the last sort, time since the last sort as a function of the number of added records) or a predetermined value. For example, the second group-of-records may be merged with the first group-of-records in response to five changes to the sequential-access data set since a previous sort. The quantity-of-changes may be determined as a function of the totality of the data set. For instance, the quantity-of-changes may be determined as a percentage of the total size of the data set; if the data set contains one-thousand records and one-percent of the data set is a trigger, the quantity-of-changes is ten because ten changes will set off the triggering event. In specific instances, quantity-of-changes may be quantity-of-additions or similar concepts.

In embodiments, the triggering event occurs in response to an operation associated with the sequential-access data set happening; for instance, an operation configured to close the sequential-access data set being requested or such close actual occurring. Sorting or merging in response to a close operation can improve efficiency because, when the sequential-access data set is opened, it will be ordered (e.g., sorted or merged). In addition, resources are sometimes at a premium when opening data sets, but perhaps less-so when closing data sets. For instance, hundreds or thousands of data sets may be opened at once during a start-up task but only a few may be closed at once during regular tasks or in a shut-down task. Other operations, such as an open operation, are contemplated (e.g., sorting or merging on open because that would place the data sets in order for subsequent use and may enhance efficiency in certain cases as regular task may require more resources than the resources needed for opening).

In embodiments, merging includes sorting. In particular, merging may include sorting in an order based on record-values of at least one record-field in a manner configured to arrange records in a particular sequence. For example, arrangement by entry sequence, key sequence, or relative-record sequence. With each, a common aspect is arrangement by position relative to the last record (e.g., the most recent record listed or accessed). In embodiments, merging includes combining the first and second groups-of-records in a manner configured to produce one group-of-records in a particular sequence. In such way, cursory observation of the one group-of-records would not reveal separate first and second groups-of-records related to ordering (other aspects, such as timestamps or relative-record number, may reveal distinct groupings).

In response to merging the second group-of-records with the first group-of-records, a marker is established at block 340. The marker may indicate the first and second group-of-records, as merged, is sorted. Put differently, the marker may identify a sorted group-of-records of the sequential-access data set by marking an end of the sequential-access data set (e.g., last record). From another perspective, establishing the marker indicates an existing group-of-records of the sequential-access data set is sorted in response to the sorting of the existing group-of-records. Creating the marker may serve to distinguish sorted and unsorted groups-of-records. In embodiments, the marker may include the position of the last record (e.g., entry, key, relative-record number). Other possibilities for the marker are contemplated, such as associating the marker with particular values of the sequential-access data set or hardware assets (e.g., a particular storage volume includes the marker).

Method 300 may conclude at block 399. Aspects of method 300 may provide benefits associated with increased efficiency when sorting or merging records of data sets in a storage system. Altogether, a storage system may be managed more efficiently.

Consider the example that follows. According to embodiments, a programmer for a new application may or may not hard code or explicitly call a sort program. The programmer can invoke BSAM, QSAM, or VSAM sequential-access methods to add, delete, or update a record when opening a data set for output processing. When opening the data set for input processing, the programmer will be able to read all records, some records, or a single record. BSAM, QSAM, and VSAM sequential-access methods may need to be updated to recognize a new keyword (e.g., SMSDS) provided by the programmer. This keyword will indicate to the access methods that the request is by System Managed Storage (SMS) for Data Sorted and will access the data according to a sorting algorithm of SMS.

The SMS Management Class is structured to allow the customer to allow or disallow (e.g., Y/N) SMS Data Sort. If a data set is not assigned to an SMS Management Class with SMS Data Sort (SMSDS) allowed by the customer and a SMSDS access methods request occurs, then the data set may or may not be sorted by SMS and all records can be read sequentially. To improve performance, the SMS Management Class may need to include a user value (e.g., DSCOUNT) to indicate when to implement the sort algorithm.

Changes to a catalog entry of a data set may occur. Fields may be added related to the total number of updates completed while the data set was opened for output (e.g., DSOUTPUT) and the record position of the last sorted record (e.g., DSLAST). Another identifier for the SMS Data Sort option in the Management Class that was implemented may also be inserted (e.g., DSMCSO). With such changes in place, a particular case can describe the invention's processing when the customer allows the SMS Data Sort option. The particular case that follows is illustrative.

First, for a data set opened for any output activity, an application can use an access method to add, delete, or update a record with keyword SMSDS. For this case, assume there are no records initially and the following unsorted data records are added: {BBB, CCC, AAA}.

When a record is created during close processing, the total number of records updated at that time will be added to the data set catalog DSOUTPUT field. For this case, DSOUTPUT will be set to 3. SMS services is then invoked to check this field to see if it has reached the DSCOUNT field in the Management Class of the data set. For this case, DSCOUNT is set to 5 by the user. Since DSOUTPUT has not reached DSCOUNT, SMS will not sort the data for this iteration and the catalog of the data set DSLAST field will remain to the initialized value of 0 to indicate that all data is unsorted: {[DSLAST Position is 0] BBB, CCC, AAA} [DSOUTPUT=3] [DSCOUNT=5].

Second, if the previous action is repeated adding another 3 unique records, then DSOUTPUT will be set to 6 which is greater then the DSCOUNT of 5. SMS will then sort the data since the Management Class SMS Data Sort option for the data set enabled (i.e., Y). For this case, assume the data is sorted alphabetically and merged sequentially. The catalog DSMCSO field of the data set will be set to Y to indicate what is specified in the Management Class of the data set initially. DSLAST is set to 6 to indicate the position of the last sorted record. DSOUTPUT is reset to 0 to indicate that all the data has been sorted. BEFORE SORT: {[DSLAST Position is 0] BBB, CCC, AAA, FFF, DDD, EEE} [DSOUTPUT=6] [DSCOUNT=5]; AFTER SORT: {AAA, BBB, CCC, DDD, EEE, FFF [DSLAST Position is 6] } [DSOUTPUT=0] [DSCOUNT=5].

Third, in this case, after open and close output activity, record BBB is deleted and 3 more unique records are added. DSOUTPUT will be set to 4 so SMS services will not be invoked to sort all the data (alternatively, DSOUTPUT could be set to 3 in an embodiment counting added records but not accounting for changes such as deletions). Because a record was deleted, DSLAST is updated since deleted records are not read in later by access methods. The data at this point is both sorted and unsorted: {AAA, [deleted record] CCC, DDD, EEE, FFF [DSLAST Position is 5], DDZ, ZZZ, ABB } [DSOUTPUT=4] [DSCOUNT=5].

Fourth, if the data set is opened for input processing with keyword SMSDS then an application reading a single record will, by default, cause access methods to first read sequentially through the sorted data area. If the record is not found or a higher record value is returned, then access methods will read sequentially through the unsorted records. The default can be changed by access methods to search the unsorted records first, followed by the sorted records if access methods decides the results are more optimal. SEARCHED FIRST (sorted records): {AAA, CCC, DDD, EEE, FFF [DSLAST Position is 5]}; SEARCHED SECOND (unsorted records): {DDZ, ZZZ, ABB }.

Fifth, if the data set is opened for input processing with keyword SMSDS and the application is reading all or some records (greater then DSLAST) then access methods will invoke SMS services to perform the same activity described in above to sort the data. Additionally it will merge all the unsorted data with the previously sorted data. The access methods will then return all the requested data. BEFORE SORT AND MERGE: {AAA, CCC, DDD, EEE, FFF [DSLAST Position is 5], DDZ, ZZZ, ABB } [DSOUTPUT=4] [DSCOUNT=5]; AFTER SORT, BEFORE MERGE: {AAA, CCC, DDD, EEE, FFF [DSLAST Position is 5], ABB, DDZ, ZZZ} [DSOUTPUT=4] [DSCOUNT=5]; AFTER SORT AND MERGE: {AAA, ABB, CCC, DDD, DDZ, EEE, FFF, ZZZ [DSLAST Position is 8] } [DSOUTPUT=0] [DSCOUNT=5].

The Management Class of the data set can be altered during a configuration change so that it is using a different SMS Data Sort option. As a result, SMS may check the DSMCSO catalog field to ensure it matches what is physically set in the Management Class. If the fields are not the same when implementing the sort methodology, then SMS will need to either stop sorting or re-sort all the of data according to the new Management Class SMS Data Sort option prior to honoring the write or read request. If SMS needs to re-sort all the data, then an SMS message can be issued to indicate that this sort request will take longer then normal due to an SMS configuration change. The previous example is presented for illustrative purposes; other embodiments in accordance with the disclosure are considered.

Figure 4:
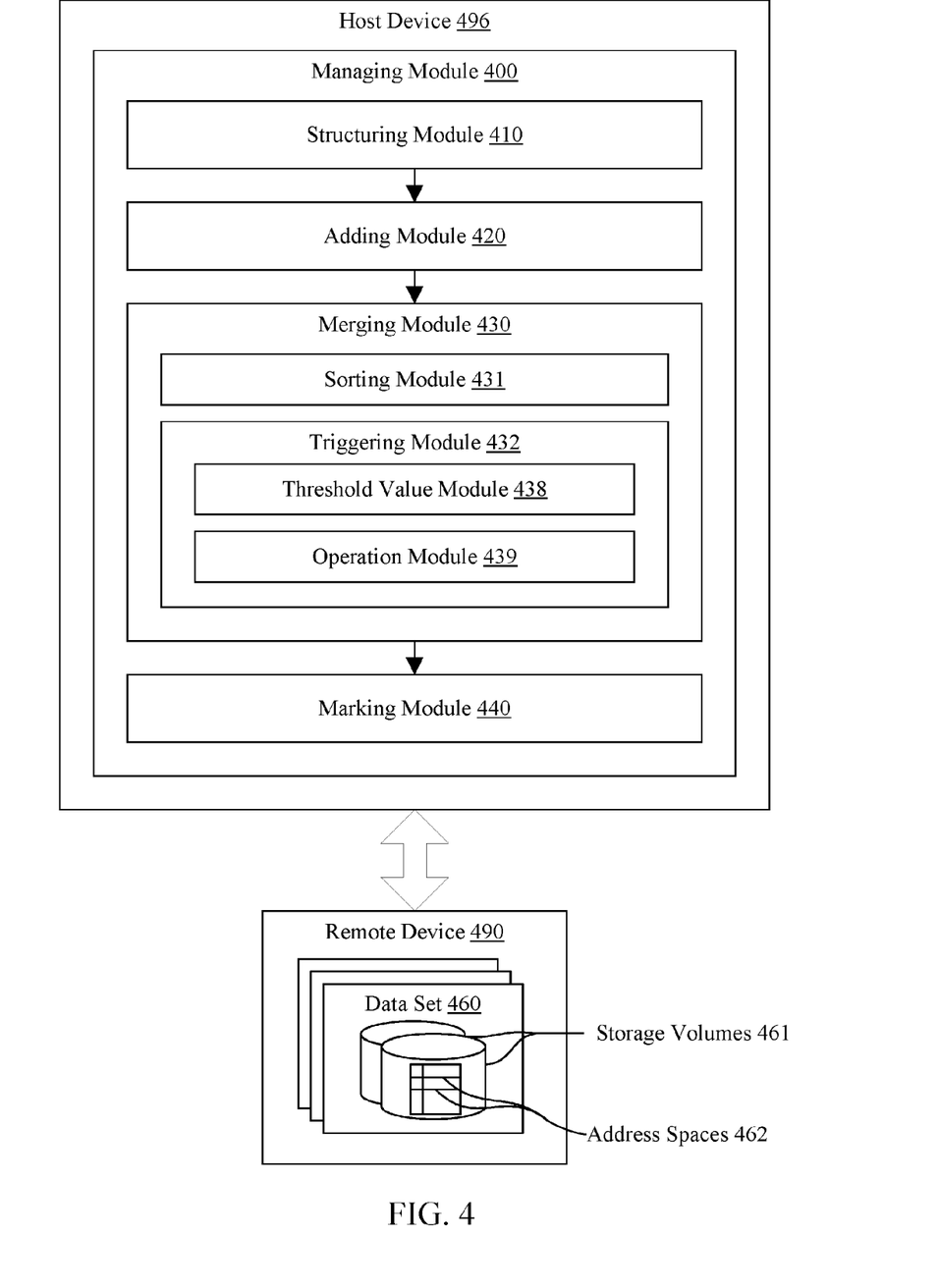
FIG. 4 shows modules of a system for sorting or merging data in storage according to embodiments.

FIG. 4 shows modules of a system for sorting or merging data in storage according to embodiments. In embodiments, method 300 may be implemented using one or more modules of FIG. 4. These modules may be implemented in hardware, software or firmware executable on hardware, or a combination thereof. For example, module functionality that may occur in a host device 496 may actually be implemented in a remote device 490 and vice versa. Other functionality may be distributed across the host device 496 and the remote device 490.

The host device 496 may include a managing module 400. The managing module 400 may be configured and arranged to manage a storage facility. The managing module 400 may include a structuring module 410, an adding module 420, a merging module 430, and a marking module 440. The merging module 430 may include a sorting module 431 and a triggering module 432, the triggering module 432 having a threshold value module 438 and an operation module 439. The remote device 490 may have a data set 460 comprising storage volumes 461 having address spaces 462.

The structuring module 410 may structure a data set to have a first group-of-records configured for adding a second group-of-records to the data set. The data set can be a sequential-access data set (e.g., records are retrieved in sequence). For example, a record may be retrieved by its entry sequence, key sequence, or relative-record sequence. Types of sequential-access data sets include Basic Sequential Access Method (BSAM), Queued Sequential Access Method (QSAM), and Virtual Storage Access Method (VSAM).

The adding module 420 adds a second group-of-records to the sequential-access data set. The second group-of-records can be separate from the first group-of-records. In embodiments, the second group-of-records may be designated as unsorted. The designation as unsorted can occur in response to adding the second group-of-records to the sequential-access data set. The designation serves the purpose of identifying each of the two separate groups-of-records (sorted and unsorted).

The merging module 430 sorts or merges the second group-of-records with the first group-of-records in response to a triggering event of the triggering module 432. In embodiments, merging includes sorting related to the sorting module 431. In particular, merging may include sorting in an order based on record-values of at least one record-field in a manner configured to arrange records in a particular sequence. In embodiments, merging includes combining the first and second groups-of-records in a manner configured to produce one group-of-records in a particular sequence.

The triggering module 432 can include, as examples, a threshold value module 438 or an operation module 439 related to the sequential-access data set. In embodiments, the triggering event occurs in response to the second group-of-records reaching a threshold value of the threshold value module 438. The threshold value module 438 may include an association with a quantity-of-changes to the sequential-access data set since a previous sort. The threshold value can be a user-defined value or a predetermined value.

In embodiments, the triggering event occurs in response to an operation of the operation module 439 associated with the sequential-access data set happening; for instance, an operation configured to close the sequential-access data set being requested or such close actual occurring. Sorting or merging in response to a close operation can improve efficiency because, when the sequential-access data set is opened, it will be ordered (e.g., sorted or merged). In addition, resources are sometimes at a premium when opening data sets, but perhaps less-so when closing data sets.

The marking module 440 establishes a marker to indicate the first and second group-of-records, as merged, is sorted. The marker is established in response to merging the second group-of-records with the first group-of-records. Put differently, the marker may identify a sorted group-of-records of the sequential-access data set by marking an end of the sequential-access data set (e.g., last record). From another perspective, establishing the marker indicates an existing group-of-records of the sequential-access data set is sorted in response to the sorting of the existing group-of-records. Creating the marker may serve to distinguish sorted and unsorted groups-of-records.

Aspects of managing module 400 may provide benefits associated with increased efficiency when sorting or merging records of data sets in a storage system. Altogether, a storage system may be managed more efficiently.

In addition to embodiments described above, other embodiments having fewer operational steps, more operational steps, or different operational steps are contemplated. Also, some embodiments may perform some or all of the above operational steps in a different order. The modules are listed illustratively according to an embodiment and are not meant to indicate necessity of a particular module or exclusivity of other potential modules.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: an object oriented programming language such as Java, Smalltalk, C++, or the like; and conventional procedural programming languages, such as the "C" programming language or similar programming languages. The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the disclosure may be devised without departing from the basic scope thereof, and the scope thereof is determined by the claims that follow.

What is claimed is:

1. A system for managing records of a sequential-access data set of a storage system, the system comprising:
  a memory; and
  a processor coupled to the memory, wherein the processor is configured to:
    sort a first group-of-records of the sequential-access data set, wherein the sequential
  access data set includes one of Basic Sequential Access Method (BSAM), Queued Sequential Access Method (QSAM), and Virtual Storage Access Method (VSAM);
    update a first field in a catalog entry of the sequential-access data set with a value indicating a record position of a last sorted record in the first group-of-records;
    add a second group-of-records to the sequential-access data set after the record position of the last sorted record in the first group-of-records;
    update a second field in the catalog entry with a value indicating the number of unsorted records in the second group-of-records;
    compare the value in the second field to a threshold associated with a quantity-of
  changes to the sequential-access data set performed by a processor since a previous sort, wherein the quantity-of-changes is determined as a percentage of the total size of the sequential-access data set, when the data set contains one-thousand records and one-percent of the data set is a trigger, the quantity-of-changes is ten because ten changes will set off the triggering event;
    in response to determining that the value in the second field exceeds the threshold, sorting the second group-of-records and merging the sorted second group-of-records with the sorted first group-of-records such that, with respect to order, the first group-of-records and the second group-of-records appear as a single group;

update the first field in the catalog entry with a value indicating a record position of a new last sorted record in the merged first and second group-of-records; and reset the second field in the catalog entry to zero after merging the second group-of-records with the first group-of-records.

\* \* \* \* \*